United States Patent
Wang et al.

(10) Patent No.: US 8,122,208 B2
(45) Date of Patent: Feb. 21, 2012

(54) SYSTEM AND METHOD FOR MEMORY ARCHITECTURE CONFIGURATION

(75) Inventors: Bi-Chong Wang, Austin, TX (US);
Vijay Nijhawan, Austin, TX (US);
Robert Volentine, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 345 days.

(21) Appl. No.: 12/411,105

(22) Filed: Mar. 25, 2009

(65) Prior Publication Data

US 2010/0250876 A1      Sep. 30, 2010

(51) Int. Cl.
*G06F 12/00* (2006.01)

(52) U.S. Cl. .......... 711/157; 711/170; 711/E12.079

(58) Field of Classification Search .......... 711/170, 711/202, 5, 157, E12.001, E12.002, E12.079
See application file for complete search history.

(56) References Cited

U.S. PATENT DOCUMENTS

| | | | | |
|---|---|---|---|---|
| 6,742,101 B2 * | 5/2004 | Miryala et al. | ...... | 711/202 |
| 6,832,304 B2 | 12/2004 | Rangarajan et al. | ...... | 711/202 |
| 7,975,109 B2 * | 7/2011 | McWilliams et al. | ...... | 711/147 |
| 2005/0198444 A1 * | 9/2005 | Yoder | ...... | 711/148 |
| 2005/0240748 A1 * | 10/2005 | Yoder | ...... | 711/170 |
| 2006/0004943 A1 * | 1/2006 | Miyata et al. | ...... | 711/5 |
| 2006/0248286 A1 * | 11/2006 | Scott et al. | ...... | 711/141 |
| 2009/0077550 A1 | 3/2009 | Rhine | ...... | 718/1 |
| 2009/0307434 A1 * | 12/2009 | Sivaramakrishnan et al. | ...... | 711/147 |

* cited by examiner

*Primary Examiner* — Pierre-Michel Bataille
(74) *Attorney, Agent, or Firm* — Baker Botts L.L.P.

(57) ABSTRACT

Systems and methods for reducing problems and disadvantages associated with physically asymmetrical memory structures are disclosed. A method for configuring memories in an information handling system having a plurality of memories, each memory local to one of a plurality of nodes, and wherein at least one memory of the plurality of memories has a different memory capacity than at least one other memory of the plurality of memories is provided. The method may include determining a smallest memory capacity of the plurality of memories. The method may also include allocating a node-interleaved memory using a portion of each memory equal to the smallest memory capacity. For each particular memory not fully allocated to the node-interleaved memory, each portion of each particular memory not allocated to the node-interleaved memory may be associated with a node local to the particular memory.

20 Claims, 3 Drawing Sheets

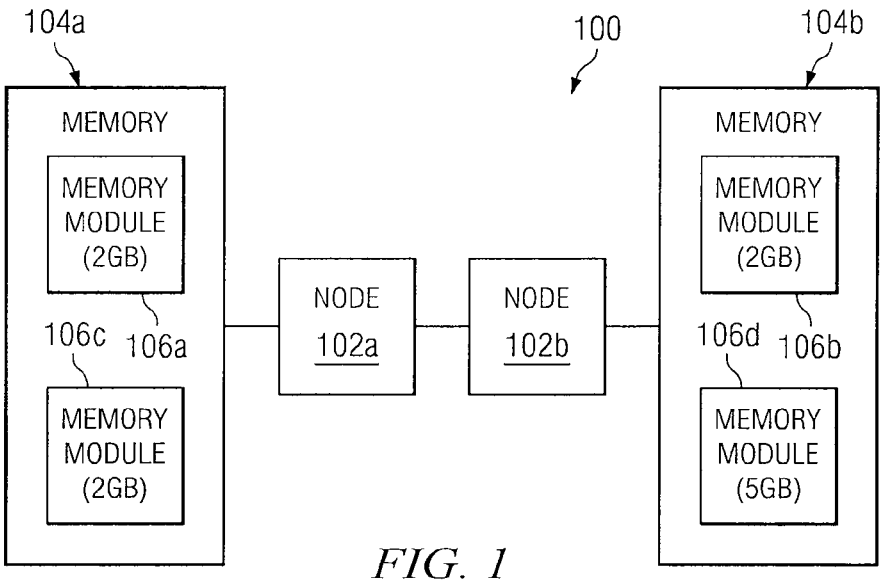
FIG. 1
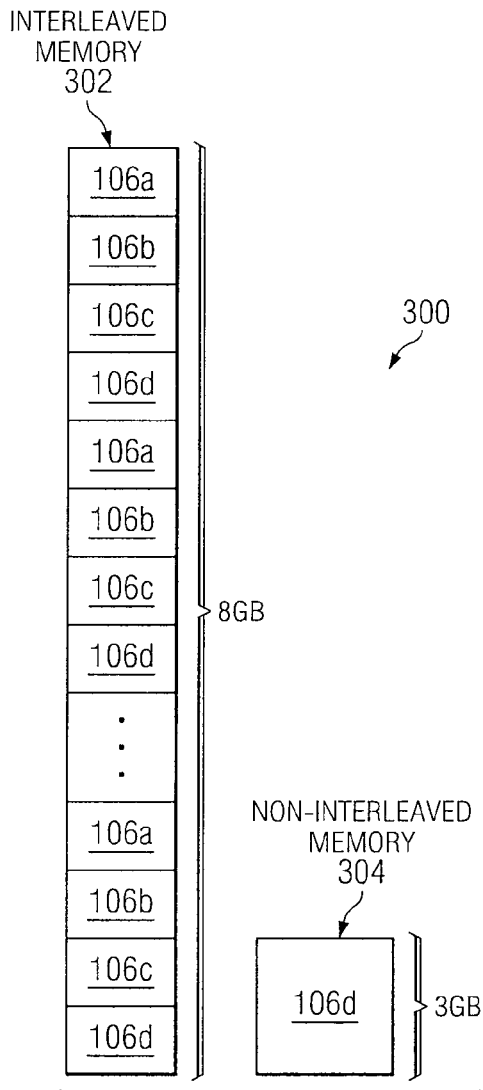
FIG. 3
| ZONE | NODE | MEMORY ALLOCATED |
|---|---|---|
| 0 | 102a | – |
| 1 | – | ALL 2GB 106a<br>ALL 2GB 106b<br>ALL 2GB 106c<br>LOWER 2GB 106d |
| 2 | 102b | UPPER 3GB 106d |
FIG. 4

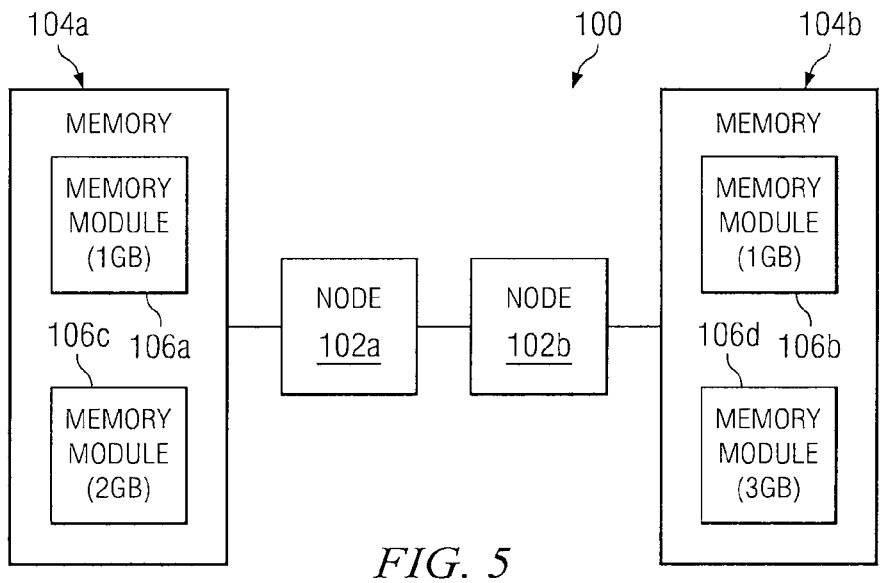
FIG. 5
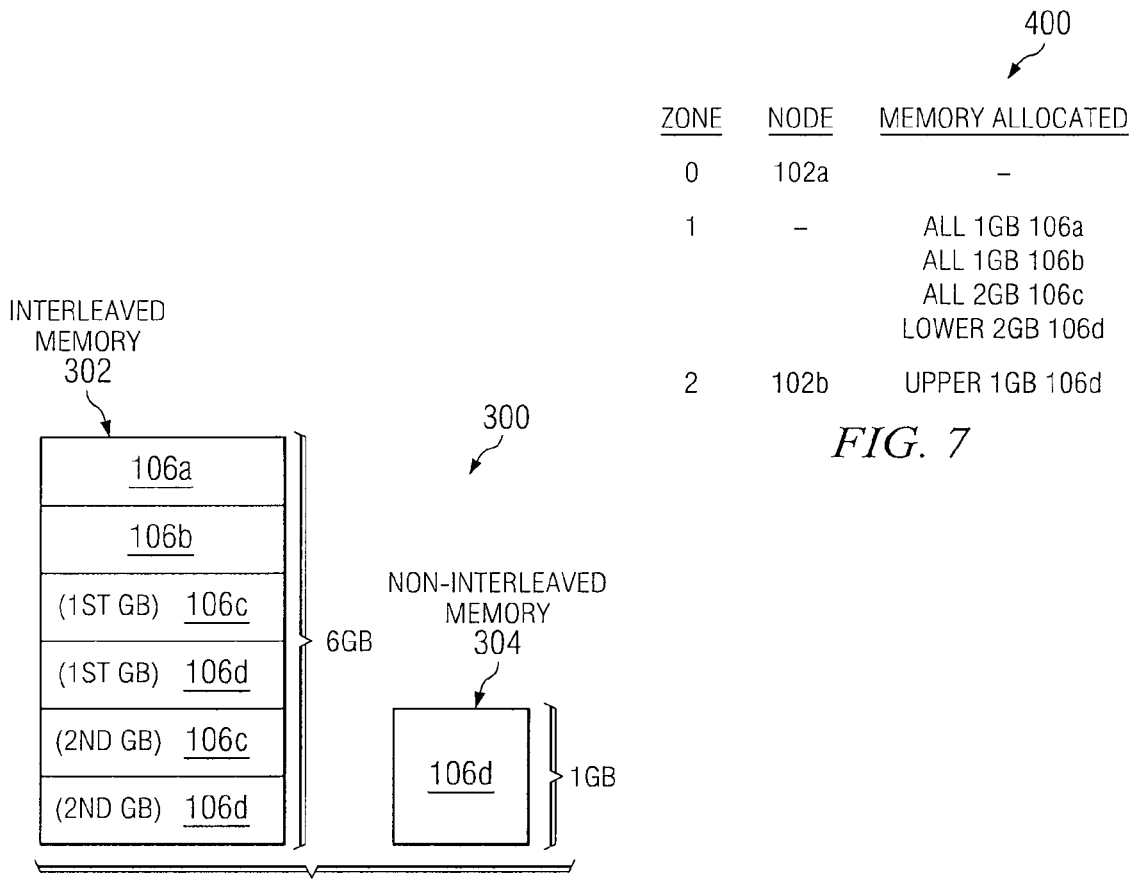
FIG. 6
| ZONE | NODE | MEMORY ALLOCATED |
|------|------|------------------|
| 0 | 102a | – |
| 1 | – | ALL 1GB 106a |
|   |   | ALL 1GB 106b |
|   |   | ALL 2GB 106c |
|   |   | LOWER 2GB 106d |
| 2 | 102b | UPPER 1GB 106d |
FIG. 7

SYSTEM AND METHOD FOR MEMORY ARCHITECTURE CONFIGURATION

TECHNICAL FIELD

The present disclosure relates in general to improving performance of memory, and more particularly combining advantages of non-uniform memory access techniques with node-interleaved memory techniques.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use one or more processors and one or more memory resources to process and store information. Physical and logical relationships among processors and their associated memory resources may be established according to any number of architectures. For example, processors and memory resources may be logically organized pursuant to a non-uniform memory access (NUMA) architecture. Under NUMA, each processor in an information handling system may be provided its own separate, dedicated memory. NUMA may be advantageous for a number of reasons. First, a processor can often access memory physically proximate to or "local" to the processor faster than non-local memory (e.g., memory local to another processor or memory shared between processors). Second, by providing a dedicated memory for each processor, a NUMA-aware operating system may optimize overall memory bandwidth and allocated local memory to a processor to the extent possible. Thus, for at least these two reasons, NUMA may provide performance advantages over memory architectures which do not employ NUMA.

Another example of a memory architecture is known as "node interleaving." Under node interleaving, contiguous system memory addresses may be alternated among memory resources in a system. For example, in a two-processor system, a first range of memory addresses may be assigned to memory local to the first processor, the next range may be assigned to memory local to the second processor, the subsequent range may be assigned to memory local to the first processor, and so on. Node interleaving is best suited for a NUMA-unaware operating system where a memory range has no affinity to a particular processor. An additional advantage of node-interleaved memory is that because it inherently balances memory access throughout a system, it may reduce localized heating that may occur if a processor were to access only memory local to it. Historically, in order to alternate memory addresses among memory resources, node interleaving required physically symmetrical memory architectures wherein each processor's local memory was identically sized (e.g., if a first processor in a two-processor system had each of a 1 GB and 2 GB memory module local to it, second processor would also require each of a 1 GB and 2 GB memory module local to it).

For various reasons including thermal, system layout, and other design reasons, information handling systems have increasingly utilized physical layouts not allowing physically symmetrical memory architectures (e.g., the number of dual inline memory module slots for each processor may differ).

In traditional information handling systems, NUMA is often automatically disabled when node interleaving is enabled, which may lead to disadvantages in information handling systems with unsymmetrical physical memory architectures. One particular disadvantage is loss of use of memory-to-processor affinity in a node-interleaved information handling system with physically unsymmetrical memory. For example, consider a two-processor information handling system wherein 2 GB of memory is local to the first processor and 3 GB of memory is local to the second processor. If node interleaving is enabled in such a system, the 2 GB of memory associated with the first processor, and the lowest 2 GB of the 3 GB of memory associated with the second processor may be interleaved to create a 4 GB node-interleaved memory. However, the upper 1 GB of the 3 GB memory local to the second processor is not part of the node-interleaved memory, and because NUMA is disabled, neither processor has any affinity to this 1 GB portion of memory.

SUMMARY

In accordance with the teachings of the present disclosure, the disadvantages and problems associated with physically asymmetrical memory architectures have been substantially reduced or eliminated.

In accordance with an embodiment of the present disclosure, a method for configuring memories in an information handling system having a plurality of memories, each memory local to one of a plurality of nodes, and wherein at least one memory of the plurality of memories has a different memory capacity than at least one other memory of the plurality of memories is provided. The method may include determining a smallest memory capacity of the plurality of memories. The method may also include allocating a node-interleaved memory using a portion of each memory equal to the smallest memory capacity. For each particular memory not fully allocated to the node-interleaved memory, each portion of each particular memory not allocated to the node-interleaved memory may be associated with a node local to the particular memory.

In accordance with another embodiment of the present disclosure, a system for configuring memories in an information handling system may include a plurality of memories and a plurality of nodes communicatively coupled to the memories. At least one memory of the plurality of memories may have a different memory capacity than at least one other memory of the plurality of memories. Each of the plurality of memories may be local to one of the plurality of nodes. At least one of the plurality of nodes is configured to: (i) determine a smallest memory capacity of the plurality of memories; (ii) allocate a node-interleaved memory using a portion of each memory equal to the smallest memory capacity; and (iii) for each particular memory not fully allocated to the node-interleaved memory, associate each portion of each particular memory not allocated to the node-interleaved memory to a node local to the particular memory.

In accordance with a further embodiment of the present disclosure, software 1 for configuring memories in an information handling system having a plurality of memories, each memory local to one of a plurality of nodes, and wherein at least one memory of the plurality of memories has a different memory capacity than at least one other memory of the plurality of memories may be provided. The software may be embodied in computer-readable media, and when executed by a processor, operable to (i) determine a smallest memory capacity of the plurality of memories; (ii) allocate a node-interleaved memory using a portion of each memory equal to the smallest memory capacity; and (iii) for each particular memory not fully allocated to the node-interleaved memory, associate each portion of each particular memory not allocated to the node-interleaved memory to a node local to the particular memory.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a block diagram of an information handling system, in accordance with embodiments of the present disclosure;

FIG. 3 illustrates a block diagram of a memory map, in accordance with embodiments of the present disclosure;

FIG. 4 illustrates a memory allocation table, in accordance with embodiments of the present disclosure;

FIG. 5 illustrates a block diagram of a particular embodiment of the information handling system depicted in FIG. 1, in accordance with the present disclosure;

FIG. 6 illustrates a block diagram of a memory map for the particular embodiment depicted in FIG. 5, in accordance with the present disclosure; and FIG. 7 illustrates a memory allocation table for the particular embodiment depicted in FIG. 5, in accordance with the present disclosure.

DETAILED DESCRIPTION

Figure 2:
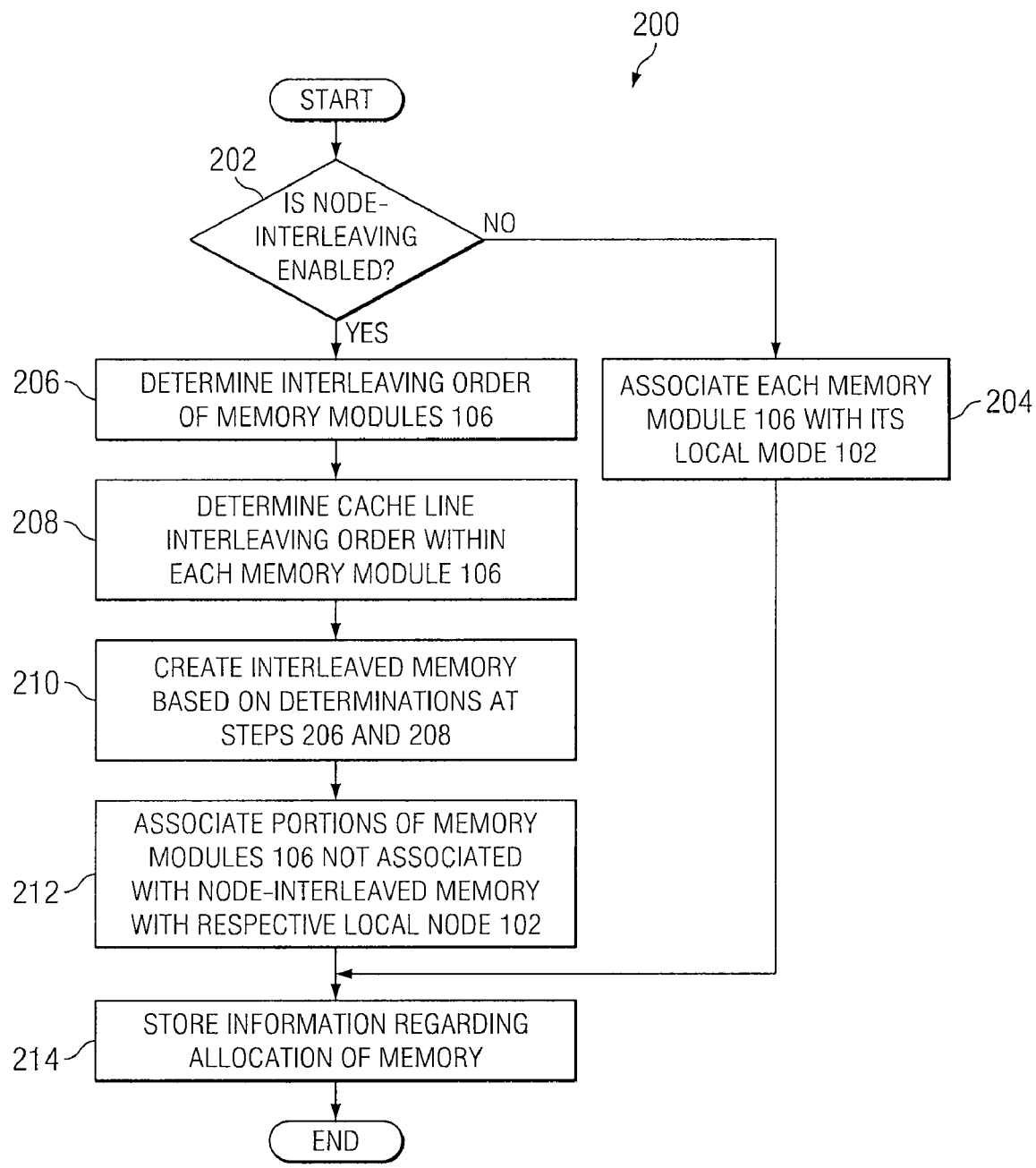
FIG. 2 illustrates an example method for memory configuration, in accordance with embodiments of the present disclosure.

Preferred embodiments and their advantages are best understood by reference to FIGS. 1-7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example information handling system 100, in accordance with embodiments of the present disclosure. In certain embodiments, information handling system 100 may be a server. In another embodiment, information handling system 100 may be a personal computer (e.g., a desktop computer or a portable computer). As depicted in FIG. 1, information handling system 100 may include one or more nodes 102, and one or more memories 104 communicatively coupled to nodes 102.

Each of nodes 102 may include any system, device, or apparatus configured to interpret and/or execute program instructions and/or process data. In certain embodiments, a node 102 may comprise a processor, for example a microprocessor, microcontroller, digital signal processor (DSP), application specific integrated circuit (ASIC), or any other digital or analog circuitry configured to interpret and/or execute program instructions and/or process data. In other embodiments, a node 102 may comprise an information handling resource, for example a personal computer, server blade, or any other device, system or apparatus that may serve as a standalone information handling system. In some embodiments, each of nodes 102 may interpret and/or execute program instructions and/or process data stored in one or more of memories 104 and/or another component of information handling system 100. As depicted in FIG. 1, each node 102 may be communicatively coupled to one or more other nodes 102. For purposes of exposition, FIG. 1 depicts information handling system 100 as having two nodes 102. However, information handling system 100 may include any suitable number of nodes 102.

Each of memories 104 may be communicatively coupled to one or more nodes 102 and may include any system, device, or apparatus configured to hold and/or house one or more memory modules 106. Each memory module may include any system, device or apparatus configured to retain program instructions and/or data for a period of time (e.g., computer-readable media). Each memory module 106 may include a random access memory (RAM) module (e.g, a dual in-line package memory, a Single In-line Pin Package (SIPP) memory, a Single Inline Memory Module (SIMM), a Dual Inline Memory Module (DIMM), a small outline DIMM (SO-DIMM)), an electrically erasable programmable read-only memory (EEPROM), a PCMCIA card, a solid state storage module (e.g., flash storage module), magnetic storage (e.g., hard disk drive), opto-magnetic storage, or any suitable memory module that retains data after power to the individual memory module and/or information handling system 100 is turned off. For purposes of exposition, FIG. 1 depicts information handling system 100 as having two memories 104 and each memory 104 having two memory modules 106. However, information handling system 100 may include any suitable number of memories 104 and/or memory modules 106.

In some embodiments, one or more memories 104 may be said to be "local" to a particular node 102 based on any number of factors including the physical architecture of information handling system 100, and/or the physical proximity of each memory 104 to individual nodes 102. In the example depicted in FIG. 1, memory 104a may be local to node 102a, and memory 104b may be local to node 102b.

Although memory modules 106 may be of any capacity, FIG. 1 depicts, for the purposes of exposition and discussion of a particular example embodiment herein, individual memory capacities of each memory module 106. In the example shown in FIG. 1, memory modules 106a-c each have a capacity of two gigabytes, and memory module 106d has a capacity of five gigabytes.

FIG. 2 illustrates an example method 200 for memory configuration, in accordance with embodiments of the present disclosure. According to one embodiment, method 200 preferably begins at step 202. As noted above, teachings of the present disclosure may be implemented in a variety of configurations of information handling system 100. As such, the preferred initialization point for method 200 and the order of the steps 200-214 comprising method 200 may depend on the implementation chosen.

At step 202, at least one of nodes 102 and/or another suitable component of information handling system 100 may determine whether or not node interleaving has been enabled for information handling system 100 (e.g., whether a user, administrator, or other person has enabled node interleaving). If node interleaving is enabled, method 200 may proceed to step 206. Otherwise, if node interleaving is not enabled (e.g., information handling system 100 is in NUMA mode), method 200 may proceed to step 204.

At step 204, in response to a determination that node interleaving is not enabled, at least one of nodes 102 and/or another suitable component of information handling system 100 may associate each memory module 106 with its local node 102 (e.g., associate memory modules 106a and 106c with node 102a and memory modules 106b and 106d with node 102b). After completion of step 204, method 200 may proceed to step 214.

At step 206, in response to a determination that node interleaving is enabled, one or more components of information handling system 100 (e.g., a basic input-output system or "BIOS" of information handling system 100) may determine how node interleaving is to be implemented (e.g., based on a particular node interleaving technology or standard). In the example depicted in FIG. 1, information handling system 100 may determine that the memory module interleaving order is 106a, 106b, 106c, and 106d. Other memory module orderings are possible.

At step 208, one or more components of information handling system 100 (e.g., a BIOS) may determine the number of cache lines from each memory module to be interleaved. The number of cache lines used may be based on the particular node interleaving technology or standard.

At step 210, at least one of nodes 102 and/or another suitable component of information handling system 100 may create a node-interleaved memory using a portion of each memory 104 equal to the capacity of the smallest memory 104 and using one or more portions of each memory module 106 equal to the capacity of the smallest memory module 106. In the example depicted in FIG. 1, the node-interleaved memory created will be eight gigabytes, comprising four gigabytes from each of memories 104, with a two-gigabyte portion from each of memory modules 106.

At step 212, at least one of nodes 102 and/or another suitable component of information handling system 100 may associate portions of memory modules 106 not associated with the node-interleaved memory with the respective node 102 local to such memory module 106. In the example shown in FIG. 1, memory module 106d has a capacity of five gigabytes, two gigabytes of which may be allocated to the node-interleaved memory pursuant to step 210. Accordingly, the remaining three gigabytes of memory module 106d not allocated to the node-interleaved memory may be associated with its local node 102b (e.g., by using a static resource affinity table (SRAT) or another suitable data structure configured to communicate the association to an operating system).

Briefly turning away from FIG. 2, FIG. 3 illustrates a block diagram of a memory map 300 depicting the results of steps 210 and 212 with respect to the example embodiment depicted in FIG. 1. FIG. 3 depicts node-interleaved memory 302 having alternating blocks of memory modules 106a, 106b, 106c and 106d (although any suitable order or method of interleaving may be used) and a non-interleaved memory 304 including a three-gigabyte portion of memory module 106d. In operation, each of nodes 102a and 102b may access node-interleaved memory 302, while node 102b may have a non-uniform memory access (NUMA) affinity to non-interleaved memory 304.

Turning back to FIG. 2, at step 214, at least one of nodes 102 and/or another suitable component of information handling system 100 may store information regarding the allocation of memory made in steps 202-212. For example, if node-interleaving is not enabled, information regarding each memory module 106 and its associated local node 102 may be stored. If node-interleaving is enabled, information regarding the portions of memory modules 106 assigned to node-interleaved memory 302, as well as information regarding non-interleaved memory 304 and its associated local node 102b may be stored. Such information may be stored in any suitable location, for example one or more of memories 104 and/or a computer-readable medium communicatively coupled to one or more of nodes 102. In some embodiments, such information may be stored in a manner similar to that depicted in FIG. 4.

FIG. 4 illustrates a memory allocation table 400 with respect to the particular example depicted in FIG. 1, in accordance with embodiments of the present disclosure. In certain embodiments, memory allocation table 400 may comprise a static-resource affinity table (SRAT). As shown in memory allocation table 400, memory may be allocated to one or more "zones" wherein each zone may have an affinity to a particular node 102. For example, with respect to the particular embodiment depicted in FIG. 1, Zone 0 may include no memory address ranges and have an affinity with node 102a (e.g., indicating that node 102a has no local non-interleaved memory allocated to it). Zone 1 may include node-interleaved memory 302 (e.g., all of memory modules 106a-106c and the lower two gigabytes of memory module 106d), and may have no affinity to any node 102 (e.g., indicating that all nodes share node-interleaved memory 302). Zone 2 may include the upper three gigabytes of memory module 106d corresponding to non-interleaved memory 304 and have an affinity with node 102b (e.g., indicating that node 102b may have non-uniform memory access to the upper three gigabytes of memory module 106d).

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. Method 200 may be implemented using information handling system 100 or any other system operable to implement method 200. In certain embodiments, method 200 may be implemented partially or fully in software embodied in computer-readable media.

For further exposition of this disclosure, FIGS. 5 through 7 depict the application of method 200 to a physical memory architecture different than that of FIG. 1. FIG. 5 illustrates a block diagram of a particular embodiment of the information handling system 100 depicted in FIG. 1 wherein memory modules 106a and 106b each have a capacity of one gigabyte, memory module 106c has a capacity of two gigabytes, and memory module 106d has a capacity of three gigabytes.

Pursuant to step 210, in embodiments in which interleaving is enabled, at least one of nodes 102 and/or another suitable component of information handling system 100 may create a node-interleaved memory using a portion of each memory 104 equal to the capacity of the smallest memory 104 and using one or more portions of each memory module 106 equal to the capacity of the smallest memory module 106. In the example depicted in FIG. 5, the node-interleaved memory created will be six gigabytes, comprising three gigabytes from each of memories 104, with a one-gigabyte portion from each of memory modules 106a-106d, followed by one-gigabyte portions from of each memory modules 106c and 106d.

Accordingly, pursuant to step 212, at least one of nodes 102 and/or another suitable component of information handling system 100 may associate portions of memory modules 106 not associated with the node-interleaved memory with the respective node 102 local to such memory module 106. In the example shown in FIG. 5, memory module 106d has a capacity of three gigabytes, two gigabytes of which may be allocated to the node-interleaved memory pursuant to step 210. Accordingly, the remaining one gigabyte of memory module 106d not allocated to the node-interleaved memory may be non-interleaved and associated with its local node 102b.

FIG. 6 illustrates a block diagram of a memory map 300 depicting the results of steps 210 and 212 with respect to the example embodiment depicted in FIG. 5. FIG. 6 depicts node-interleaved memory 302 having alternating blocks of portions of memory module 106a, memory module 106b, the first one-gigabyte portion of memory module 106c, the first one-gigabyte portion of memory module 106d, the second one-gigabyte portion of memory module 106c, and the second one-gigabyte portion of memory module 106d (although any suitable order or method of interleaving may be used) and a non-interleaved memory 304 including a one-gigabyte portion of memory module 106d. In operation, each of nodes 102a and 102b may access node-interleaved memory 302, while node 102b may have a non-uniform memory access (NUMA) affinity to non-interleaved memory 304.

FIG. 7 illustrates a memory allocation table 400 with respect to the particular example depicted in FIG. 5, in accordance with embodiments of the present disclosure. With respect to the particular embodiment depicted in FIG. 5, Zone 0 may include no memory address ranges and have an affinity with node 102a (e.g., indicating that node 102a has no local non-interleaved memory allocated to it). Zone 1 may include node-interleaved memory 302 (e.g., memory ranges associated with memory modules 106a-106c and the interleaved two gigabytes of memory module 106d), and may have no affinity to any node 102 (e.g., indicating that all nodes share node-interleaved memory 302). Zone 2 may include one gigabyte of memory ranges of memory module 106d corresponding to non-interleaved memory 304 and have an affinity with node 102b (e.g., indicating that node 102b may have non-uniform memory access to the upper one gigabyte of memory module 106b).

Using the methods and systems disclosed herein, problems associated with conventional approaches to configuring node-interleaved memory may be improved, reduced, or eliminated. For example, methods and systems disclosed herein may provide a technique for creating a hybrid node-interleaved and NUMA memory architecture in order to take advantages of the benefits of interleaving without effectively losing node affinity to non-interleaved portions of memory.

Although the present disclosure has been described in detail, it should be understood that various changes, substitutions, and alterations can be made hereto without departing from the spirit and the scope of the disclosure as defined by the appended claims.

What is claimed is:

1. A method for configuring memories in an information handling system having a plurality of memories, each memory local to one of a plurality of nodes, and wherein at least one memory of the plurality of memories has a different memory capacity than at least one other memory of the plurality of memories, the method comprising:
   determining a smallest memory capacity of the plurality of memories;
   allocating a node-interleaved memory using a portion of each memory equal to the smallest memory capacity; and
   for each particular memory not fully allocated to the node-interleaved memory, associating each portion of each particular memory not allocated to the node-interleaved memory to a node local to the particular memory.

2. A method according to claim 1, wherein each memory includes one or more memory modules, the method further comprising:
   determining a smallest memory module capacity of the one or more memory modules for the plurality of memories;
   allocating the node-interleaved memory using a portion of each memory module equal to the smallest memory module capacity; and
   for each particular memory module not fully allocated to the node-interleaved memory, associating each portion of each particular memory module not allocated to the node-interleaved memory to a node local to the particular memory associated with the memory module.

3. A method according to claim 1, further comprising:
   determining if node interleaving is enabled for the information handling system; and
   allocating the node-interleaved memory only if node interleaving is enabled.

4. A method according to claim 1, further comprising storing information regarding the allocation and association of memory.

5. A method according to claim 4, wherein the information is stored in a static resource affinity table.

6. A method according to claim 1, wherein associating a particular portion of a memory to a particular node indicates an affinity of the particular node for accessing the particular portion of the memory.

7. A method according to claim 6, wherein the affinity is non-uniform memory access affinity.

8. A system for configuring memories in an information handling system, comprising:
- a plurality of memories, wherein at least one memory of the plurality of memories has a different memory capacity than at least one other memory of the plurality of memories; and
- a plurality of nodes communicatively coupled to the memories, wherein each of the plurality of memories are local to one of the plurality of nodes and wherein at least one of the plurality of nodes is configured to:
  - determine a smallest memory capacity of the plurality of memories;
  - allocate a node-interleaved memory using a portion of each memory equal to the smallest memory capacity; and
  - for each particular memory not fully allocated to the node-interleaved memory, associate each portion of each particular memory not allocated to the node-interleaved memory to a node local to the particular memory.

9. A system according to claim 8, each memory comprising one or more memory modules, and wherein the at least one of the plurality of nodes is further configured to:
- determine a smallest memory module capacity of the one or more memory modules for the plurality of memories;
- allocate the node-interleaved memory using a portion of each memory module equal to the smallest memory module capacity; and
- for each particular memory module not fully allocated to the node-interleaved memory, associate each portion of each particular memory module not allocated to the node-interleaved memory to a node local to the particular memory associated with the memory module.

10. A system according to claim 8, the at least one of the plurality of nodes further configured to:
- determine if node interleaving is enabled for the information handling system; and
- allocate the node-interleaved memory only if node interleaving is enabled.

11. A system according to claim 8, the at least one of the plurality of nodes further configured to store information regarding the allocation and association of memory.

12. A system according to claim 11, the at least one of the plurality of nodes further configured to store the information in a static resource affinity table.

13. A system according to claim 8, wherein association of a particular portion of a memory to a particular node indicates an affinity of the particular node for accessing the particular portion of the memory.

14. A system according to claim 13, wherein the affinity is non-uniform memory access affinity.

15. A system according to claim 8, wherein the each of the plurality of nodes is a processor.

16. Software embodied in a non-transitory computer readable medium, the software for configuring memories in an information handling system having a plurality of memories, each memory local to one of a plurality of nodes, and wherein at least one memory of the plurality of memories has a different memory capacity than at least one other memory of the plurality of memories, the software embodied in computer-readable media, and when executed by a processor, operable to:
- determine a smallest memory capacity of the plurality of memories;
- allocate a node-interleaved memory using a portion of each memory equal to the smallest memory capacity; and
- for each particular memory not fully allocated to the node-interleaved memory, associate each portion of each particular memory not allocated to the node-interleaved memory to a node local to the particular memory.

17. Software according to claim 16, wherein each memory includes one or more memory modules, the software further operable to, when executed:
- determine a smallest memory module capacity of the one or more memory modules for the plurality of memories;
- allocate the node-interleaved memory using a portion of each memory module equal to the smallest memory module capacity; and
- for each particular memory module not fully allocated to the node-interleaved memory, associate each portion of each particular memory module not allocated to the node-interleaved memory to a node local to the particular memory associated with the memory module.

18. Software according to claim 16, the software further operable to, when executed, store information regarding the allocation and association of memory.

19. Software according to claim 18, wherein the information is stored in a static resource affinity table.

20. Software according to claim 16, wherein association of a particular portion of a memory to a particular node indicates an affinity of the particular node for accessing the particular portion of the memory.

* * * * *